May 5, 1931. A. J. WEATHERHEAD, JR 1,803,578
SECTIONAL PIPE COUPLING
Filed April 13, 1927
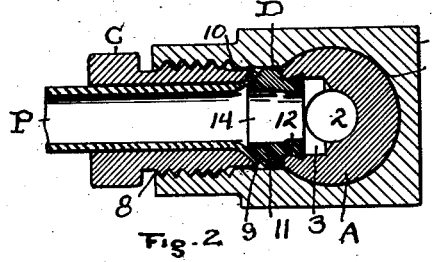
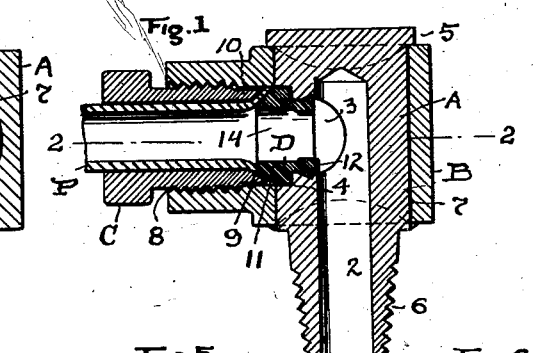
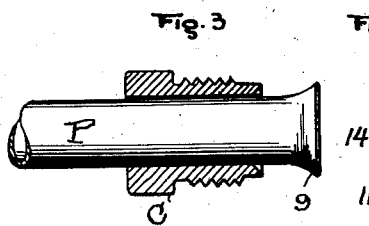
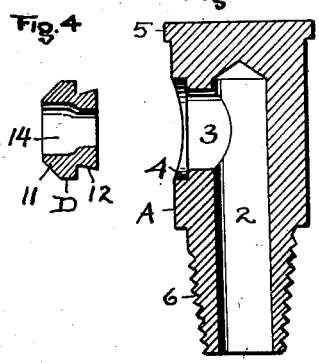
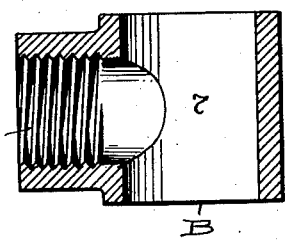
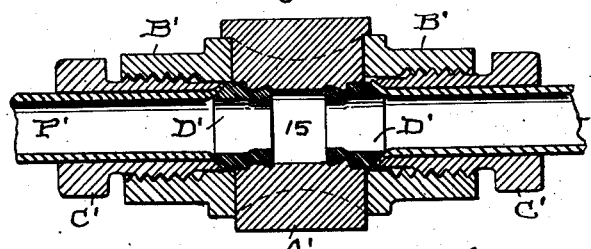
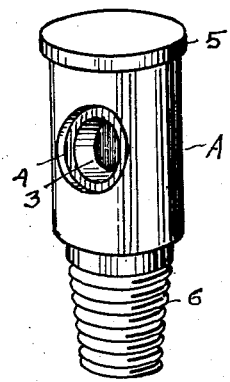
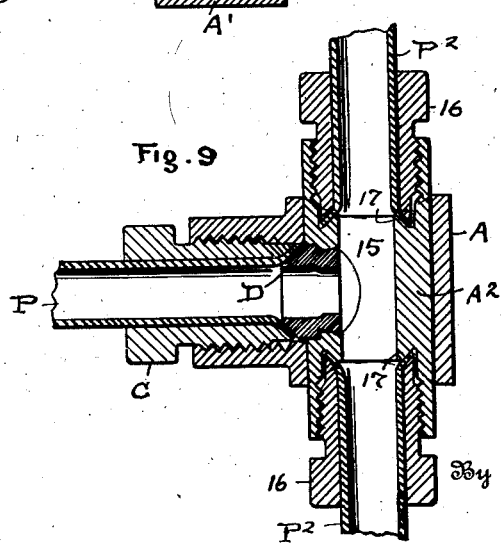
Inventor
A. J. WEATHERHEAD JR.
By Fisher, Musser & Moore
Attorney Patented May 5, 1931

1,803,578

UNITED STATES PATENT OFFICE

ALBERT J. WEATHERHEAD, JR., OF CLEVELAND, OHIO

SECTIONAL PIPE COUPLING

Application filed April 13, 1927. Serial No. 183,375.

The present device is an improvement in the pipe coupling shown and described in my co-pending application, Serial No. 183,372 filed April 13, 1927, and the invention herein involves the use of two sleeved members having a conical element or nipple affixed to one of said members to permit a fluid-tight pipe connection to be made therewith. As constructed and arranged the nipple is formed with a conical tip to permit a flanged pipe to be clamped in sealing union therewith. The nipple is also made in a particular way to permit a portion thereof to be expanded and interlocked with one section subsequently to the assembly of the main sections and the introduction of the nipple into the fluid passage at the joint line between said sections. A separate nipple introduced into the passage at the joint line between two coupling sections also functions to lock the sections inseparably together, thereby permitting a round section to be seated within a round opening in another section without rotative movement between the parts. A separate nipple affixed to one side of a round body also facilitates attachment of a flanged pipe with good sealing effect to the round side of such a body. Furthermore, the separate sections or parts comprising this coupling device may be made accurately and cheaply in automatic screw machines and readily assembled together, and various types and kinds of couplings or fittings may be made by modifying parts thereof without departing from the invention described and claimed herein.

In the accompanying drawing, Fig. 1 is a sectional view of a sectional coupling of angular form embodying my improvement, and Fig. 2 is a horizontal section of the same device on line 2—2 of Fig. 1. Fig. 3 is a side view of a flanged pipe and a tubular coupling nut sleeved thereon. Fig. 4, is a sectional view of the conical nipple as it appears before it is introduced into the main section or body member. Fig. 5 is a sectional view of one form of body member to which the said nipple may be affixed. Fig. 6 is a sectional view of one form of yoke member or sleeve section which may be used with the body member delineated in Fig. 5. Fig. 7 is a perspective view of the body member shown in section in Fig. 5. Fig. 8 is a sectional view of a straight coupling or fitting embodying my improvement, and Fig. 9 is a sectional view of a T fitting containing the invention.

The coupling device shown in Figs. 1 to 7, inclusive, comprises a round cylindrical body A having a longitudinal passage 2 extending partly through the same and communicating with a round side opening 3 having an enlarged counter bore 4 in the round side surface of the body. The closed end of body A is formed with an annular flange 5 and the opposite open end 6 is screw-threaded externally to permit attachment to a receiving vessel, a supply receptacle, a pipe, or other appliance. A coupling yoke or sleeve B, having a round opening 7 adapted to receive round body A, is provided with a screw-threaded opening 8 at right angles to the axis of opening 7 to permit a pipe P to be connected therewith. As shown pipe P is formed with a flaring end flange 9, and a tubular coupling nut C is sleeved upon the pipe and provided with a smooth round tip 10 having a flaring mouth adapted to seat flange 9. A second clamping seat for the pipe flange is provided by the conical end or tip 11 of a nipple D which is seated within counterbore 4 in body A. Nipple D has a short flaring extension or neck 12 of reduced diameter adapted to extend into side opening 3, and it is formed with a central opening 14 which is reduced in diameter originally where it passes through neck 12. However the reduced portion of the passage is later enlarged to the same or approximately the same diameter as the mouth in the conical part of the nipple, when the flaring neck 12 is expanded by a suitable wedging tool introduced into the mouth end of the nipple after the yoke and body sections have been assembled and the nipple has been introduced into side opening 3 and seated within counterbore 4. Expansion of neck 12 forces the inclined sides and sharp corner edge of neck 12 into the wall of opening 3, thereby locking the nipple to body A with a fluid-tight joint.

The truncated cone or tip 11 may extend more or less into the inner end of opening 8 in yoke B, and the wall at the inner end of the opening may be smoothly finished and of the same diameter as the round tip 11 of nipple D so that the nipple will engage the yoke and prevent body A from turning therein and also lock the body against longitudinal movement relatively to the yoke. In brief, nipple D thus serves to lock the body and yoke sections inseparably together while providing a conical expanding and clamping seat for the flanged end of pipe P when coupling nut C is screwed to its limit into the screw-threaded opening in the yoke.

The same conception and coupling arrangement may be carried into other forms of sectional couplings embodying sleeved body and yoke sections, and one exemplification thereof is found in Fig. 8, which shows a straight coupling or fitting comprising a body member A' having a straight cross port or passage 15 therein and separate nipples D'—D' affixed within the opposite ends of said passage to permit a pair of pipes P'—P' to be clamped against the same by utilizing a pair of coupling nuts C'—C' within opposite ends of a yoke member B' having a central opening for body A'. In this form of the device both nipples D'—D' lock the yoke and body together and provide a pair of sealing seats for two pipes P'—P'. Compared with the angle fitting shown in Fig. 1, both the yoke and body sections have been modified without change in the nipple structure, except that two such nipples have been used instead of one. However, in Fig. 9 I show a T fitting for coupling three pipes together by merely utilizing the same yoke A and coupling nut C shown in Fig. 1, and by substituting only another form of body member A² in which a single nipple D is affixed. Thus body A² is provided with a passage 15 open at its opposite ends to permit two pipes P²—P² to be connected therewith, in open communication with nipple D in one side of the body. Coupling nuts 16—16 may be used to connect pipes P²—P² to the ends of body A², and the pipes may be flanged to clamp against conical seats 17—17 formed within the body at opposite ends of passage 15. Otherwise the body and the nipple affixed thereto and the yoke member are the same as in Fig. 1.

What I claim is:

1. A sectional pipe coupling, comprising a body member and a sleeve therefor having connecting fluid passages and sleeved over each other angularly with respect to said passages, and a pipe sealing nipple within one of said passages and opposite and aligned with the other of said passages locking said body member and sleeve together.

2. A sectional pipe coupling, comprising a body member having a passage, a yoke member sleeved over said body member having a pipe connection aligned with said passage and angularly related to the sleeving axis of said body and yoke, and a conical nipple in said passage at the joint between said members opposite said pipe connection.

3. A sectional pipe coupling, comprising a body member having a passage, a second member having openings and sleeved over said body member said openings being angularly related to each other and one of said openings being adapted to receive a pipe, and a separate nipple seated with one side of said body member axially of said last opening in said second member adapted to provide a clamping seat for said pipe.

4. A sectional pipe coupling, comprising body and yoke sections sleeved together having axially aligned communicating passages and being angularly sleeved together with respect to such passages and a separate pipe sealing nipple affixed to one of said sections at the joint line between said sections.

5. A sectional pipe coupling, comprising a body member having a passage therein and a nipple sealed within said passage, a yoke member sleeved over said body member angularly with respect to said passage of said body member, a flanged pipe adapted to be clamped against said nipple, and a coupling nut for said pipe connected with said yoke member.

6. A sectional pipe coupling, comprising a body member having a passage, a nipple having a flaring neck extending into and locked to said member within said passage, and a pipe coupling member sleeved upon said body member and enclosing said nipple.

7. A sectional pipe coupling, comprising a body member having a passage and a counterbored opening in one side open to said passage, a nipple member seated within said counterbored opening, a yoke member sleeved upon said body member having a screw-threaded opening axially co-incident with said nipple, and a tubular coupling nut within said screw-threaded opening adapted to clamp a flanged pipe against said nipple.

8. A sectional pipe coupling, comprising a round cylindrical body having a central passage and a side opening, a separate nipple affixed to said body within said side opening, a second member having a round opening adapted to receive said cylindrical body and formed with a screw-threaded opening opposite said nipple, a pipe having a flanged end engaging said nipple, a coupling nut for said pipe within said screw-threaded opening, and said body having means adapted to connect the same to another part.

9. A sectional pipe coupling, comprising a round body having a side opening, a yoke member having a screw-threaded opening for a pipe connection and a round opening angularly related to said first opening adapted to receive said body, a nut screwed into said screw-threaded opening of said yoke member, and a separate nipple within said side opening at the joint between said body and yoke adapted to be engaged by said nut to lock said sections together and to provide a sealing seat for a pipe.

10. A sectional pipe coupling, comprising a body section having a passage, a pipe coupling section sleeved upon said body section angularly with respect to said passage, and a pipe sealing nipple expanded within said passage and locked to one of said sections.

11. A sectional pipe coupling, comprising two sleved members, a nut angularly related to the sleeving axis of said members, and a pipe sealing nipple axially aligned with said nut locking said members together.

In testimony whereof I affix my signature.

ALBERT J. WEATHERHEAD, Jr.